March 18, 1941.  L. F. WILEY  2,235,185
BURIAL VAULT
Filed Sept. 12, 1939   2 Sheets-Sheet 1

Inventor
L. F. Wiley

By Clarence A. O'Brien
and Hyman Berman
Attorneys

March 18, 1941.  L. F. WILEY  2,235,185
BURIAL VAULT
Filed Sept. 12, 1939  2 Sheets-Sheet 2

L. F. Wiley, Inventor

By Clarence A. O'Brien
and Hyman Berman
Attorneys

Patented Mar. 18, 1941

2,235,185

UNITED STATES PATENT OFFICE 2,235,185

BURIAL VAULT

Lindsay F. Wiley, Oliphant Furnace, Pa.

Application September 12, 1939, Serial No. 294,537

1 Claim. (Cl. 72—7)

This invention relates to burial vaults, and has for the primary object the provision of a construction of vault wherein one or more burials or bodies may be accommodated therein with each burial compartment protected from exterior moisture entering therein and each compartment draining to a common drainage pit as well as the walls draining to said pit, so that the burial compartments will remain substantially dry under all conditions, the construction of the vault being such that it may be easily and economically set up.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a burial vault constructed in accordance with my invention with the cover removed.

Figure 1:
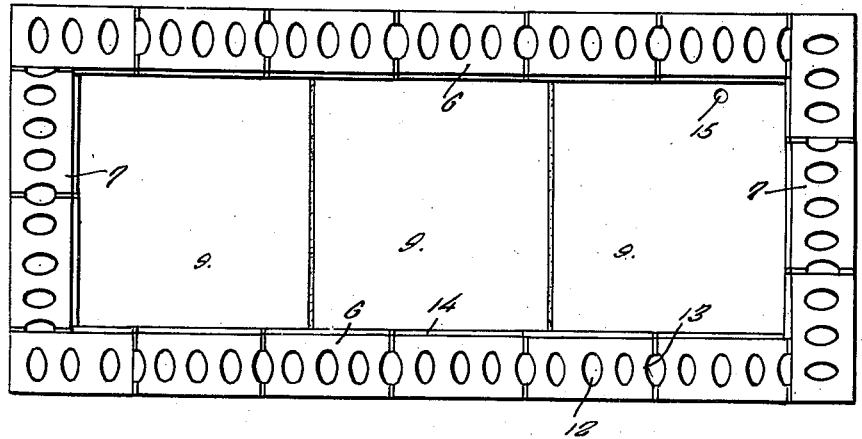
Figure 2:
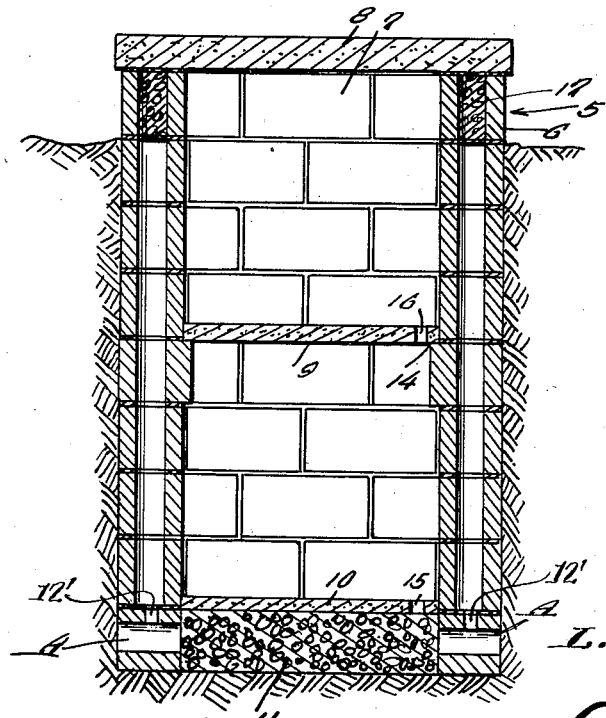
Figure 2 is a transverse sectional view illustrating the vault with the cover applied and showing the drainage pit and the construction of the walls.
Figure 3:
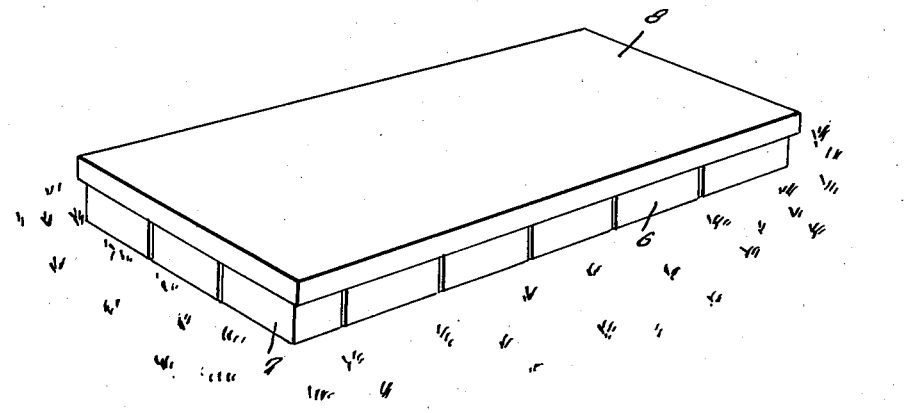
Figure 3 is a perspective view showing the appearance of the vault above the surface of the ground.
Figure 4:
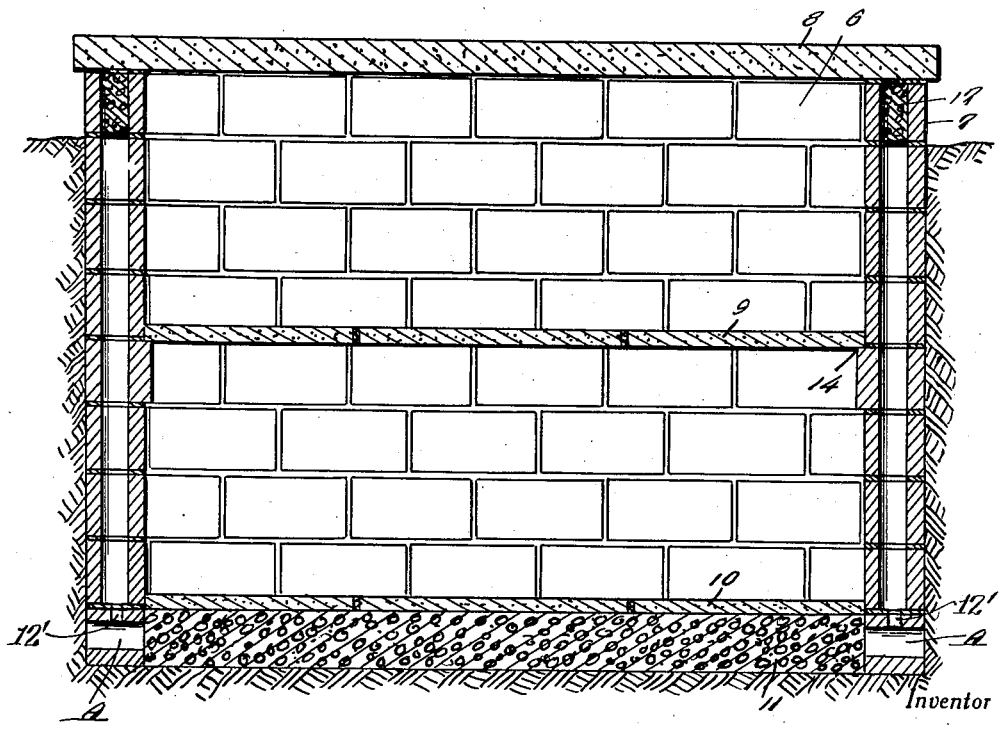
Figure 4 is a longitudinal sectional view illustrating the vault.

Referring in detail to the drawings, the numeral 5 indicates a burial vault especially constructed to permit one or more burials or bodies to be accommodated therein by the provision of separate burial compartments wherein the compartments will be efficiently protected from exterior moisture and each having draining facilities so that the compartments will remain substantially dry. In the present showing made of this vault in the drawings provision is made for the accommodation of two burials or two bodies arranged in superimposed relation each within a separate compartment. However, the vault may be readily constructed to accommodate additional bodies each within a compartment by enlarging the vault and providing therein a vertical partition (not shown) for the separation of the superimposed burial compartments.

The burial vault as shown in the drawings is set up within a hole provided in the ground and is composed of vertically arranged side and end walls 6 and 7 and a cover 8 and floors 9 and 10.

In preparing the hole in the ground to receive the vault, a drainage pit 11 is provided therein wherein is located loosely arranged material, such as small stone, gravel, sand and the like which will readily take up moisture and allow said moisture to seep into the ground. The vault is built up within the opening in the ground with the drainage pit 11 located lowermost or with a portion as shown in the drawings confined within the walls of the vault.

The vertical walls 6 and 7 of the vault are composed of composition blocks each having openings 12 therein and grooves 13 arranged in the end walls thereof so that when certain blocks are brought together the grooves match and provide continuous passages from the top of the wall to the bottom of said wall except for the lower layer of blocks arranged within the opening in the ground and about the drainage pit, these blocks being indicated by the character A and are so positioned that the openings and grooves are disposed horizontally connecting the drainage pit with the ground or soil exteriorly of the walls so that any moisture passing downwardly on the exterior of the walls may pass through the blocks A into the drainage pit, thereby maintaining the soil adjacent to the exterior faces of the walls in a substantially dry condition. Openings 12' are provided in the top walls of the blocks A and match with the passages formed by the grooves and openings of the other blocks thereabove, whereby moisture entering the passages may pass to the drain pit.

The vault is preferably provided with internal ledges 14 for the support of the floors 9 and 10 which separate the vault into burial compartments arranged in superimposed relation. The ledges 14 are formed by employing blocks which have a slight increased width or thickness over the other blocks employed. The floor 10 contacts the material of the drainage pit 11 and has a drain opening 15 therein. The floor 9 is also provided with a drainage opening 16. It is preferable that the floor 9 be constructed of a series of sections to facilitate the handling thereof and when assembled in the vault the spaces between said sections are suitably filled and sealed with cement, mortar and the like. It is also to be understood that cement or mortar is placed between the layers of blocks to prevent moisture from passing between the blocks from the exterior of the vault to the interior thereof.

The upper row of blocks of the vertical walls may be positioned above the surface of the ground and the openings thereof are preferably closed by cement or similar material, as indicated at 17. However, the openings in the blocks below the upper layer are left open to form dead air chambers which will intercept any moisture passing through the outer walls of the blocks and directs said moisture downwardly to the drain pit and thereby prevent the entrance of this exterior moisture from reaching the burial compartments, consequently allowing said compartments to maintain a substantially dry condition.

The cover 8 is preferably cemented onto the upper layer of blocks of the vertical walls and if desired suitable tie bolts may be employed for the further securing of the cover on the vertical walls of the vault. The cover being sealed onto the upper layer of blocks prevents moisture from seeping into the burial vault between the walls and the cover.

It is to be understood that when the first burial takes place in the vault the body is arranged within the lower compartment on the floor 10 and the floor 9 is then placed in position and sealed or cemented to the ledges 14, thereby effectively closing the body to exterior moisture and atmospheric conditions. When the second burial takes place the body is placed in the upper compartment on the floor 9.

A burial vault of the character described in detail and shown in the drawings can be economically and easily set up and will provide substantially dry compartments for the accommodation of the bodies and the caskets therefor.

It is believed that the foregoing description, when taken in connection with the drawings will fully set forth the construction and advantages of this invention to those skilled in the art to which such a device relates, so that further description will not be required.

Having thus described the invention, what I claim is:

A burial vault comprising vertically arranged walls composed of layers of composition blocks sealed together with certain of said blocks projecting inwardly of the other blocks to provide a ledge within the walls, said blocks having openings therein and the openings of the blocks aligning to provide air spaces within the walls and acting also as drainage mediums downwardly through the walls, a floor supported on said ledge to provide within the walls upper and lower burial compartments and including sections adapted to be sealed together and to the ledge, a cover resting on and secured to said walls, a second floor arranged within the walls below the first floor for the lower compartment, said floors having drain openings, and a drain pit arranged under the second floor and including loosely arranged material, said walls having the lowermost blocks thereof positioned to arrange the openings of said blocks horizontally and in communication with the drain pit and provided with openings connecting with the drain passages of said walls to permit moisture therein to reach the drain pit by way of the openings of the latter-named blocks.

LINDSAY F. WILEY.